Sheet.1. 2.Sheets.

A. G. Ritz.
Shingle-Machine.

Nº 75793  Patented Mar. 24, 1868

Witnesses.
Saml F. Estell.
W. P. Estell.

Inventor.
A. G. Ritz.
By Joseph Ridge his attorney

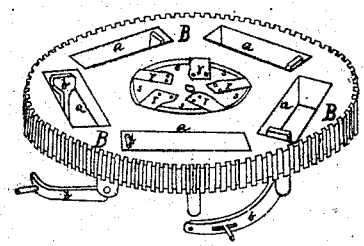
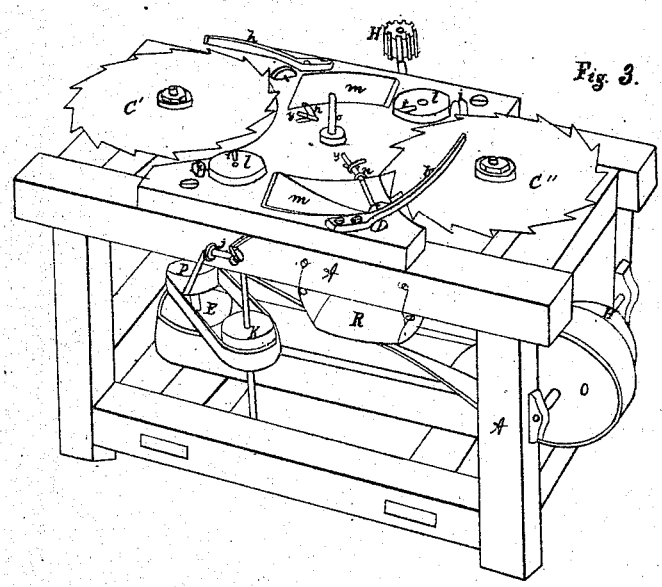

United States Patent Office.

ADAM G. RITZ, OF ELIZABETHTOWN, INDIANA, ASSIGNOR TO HIMSELF, JOHN B. CARTER, AND WILLIAM LINDLEY.

Letters Patent No. 75,793, dated March 24, 1868.

IMPROVEMENT IN SHINGLE-MACHINES.

The Schedule referred to in these Letters Patent and making part of the same.

TO ALL WHOM IT MAY CONCERN:

Be it known that I, ADAM G. RITZ, of Elizabethtown, in the county of Bartholomew, and State of Indiana, have invented a new and useful Improvement in Shingle-Machines; and I do hereby declare that the following is a full, clear, and exact description of the same, reference being had to the accompanying drawings, making a part of this specification, in which—

Figure 1:
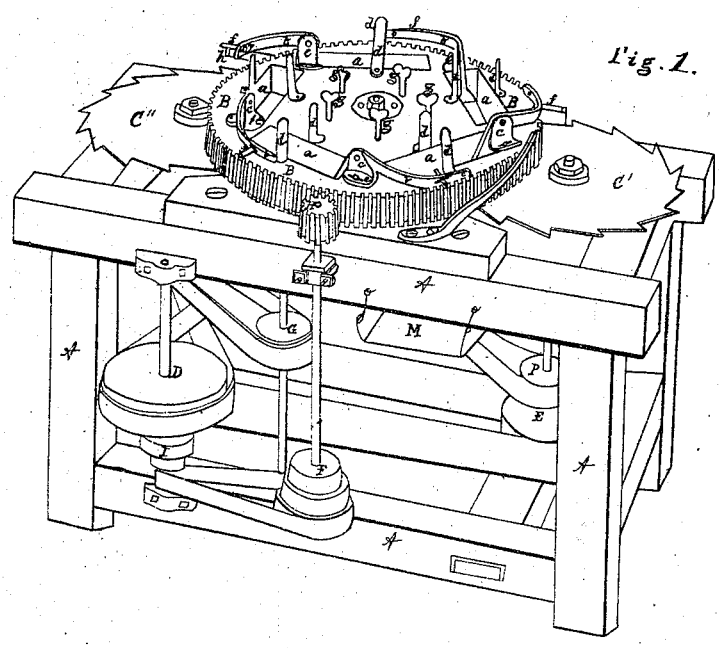

Figure 1 is a perspective view.

Figure 2:
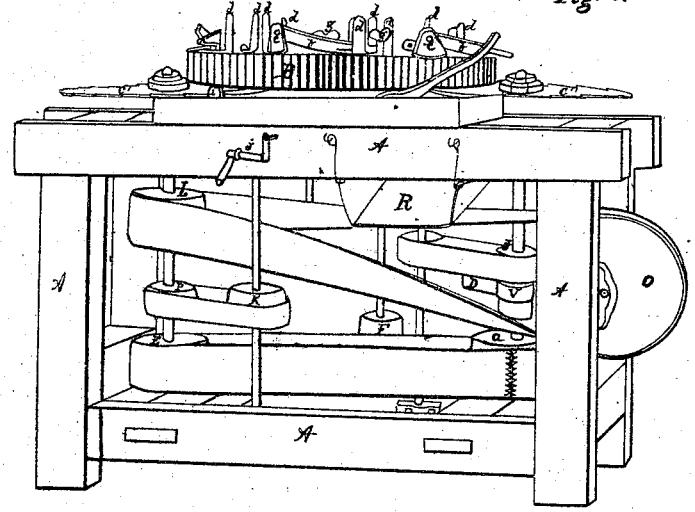

Figure 2, a side elevation.

Figure 3, a sectional view; and

Figure 4, an inverted wheel.

The same letters in the different figures refer to corresponding parts of the machine.

To enable others skilled in the art to make and use my invention, I will proceed to describe its construction and operation.

A represents the frame or structure for supporting the machinery. B represents a toothed wheel or disk, having rectangular openings $a\ a\ a\ a\ a$. $C'$ and $C''$ are circular saws. $l$ and $l'$, fig. 3, show rotating disks, provided with planing-bits $t$. $m$ and $m'$ are hinged platforms, secured by hinges at the ends nearest the plane-disks $l$. $o'$ represents the axis of the wheel B. The manner of giving motion to the different parts is by communicating power to the driving-pulley X, from which it is transmitted by a belt from pulley O on same shaft to pulley L on the vertical shaft of saw $C'$. A belt connecting pulley E with pulley $g$, runs saw $C''$; a belt connecting pulley P with pulley K, runs one of the planers. The other planer is run by a belt connecting pulley J with pulley G. The pulley D is connected by a belt with pulley V on shaft of saw $C''$, by which a belt connecting cone-pulley I with cone-pulley F, transmits motion to the pinion H, which latter gears with and runs wheel B. The bearing $K'$ of the pinion-shaft is connected, by a rod running through the top of the structure, with crank $j$ at the front of the machine, by which the pinion H may be thrown in and out of gear at the pleasure of the operator. $h$ and $h$ are stationary arms standing at an inclination, and conforming in shape to the circumference of wheel B. $b\ b\ b\ b\ b$ are levers, pivoted in the jaws C. The extending ends of said levers are slotted, in which are secured arms $f$, in an adjustable manner. $i\ i\ i\ i$ represent rollers for steadying the rotating wheel B. S, fig. 4, is a circular groove in the under side of wheel B, crossed by springs or strips $r$, which latter are fastened at their inner ends, their outer ends being acted on by set-screws $g$. $n$ and $n$ are levers, having right-angular ends $y$, situated in a line with groove S, and the other end terminating beneath the platforms $m$ and $m'$.

The shafts of the saws and planers rest at the bottom of the structure on set-screws, by which said saws and plane-disks may be adjusted relatively in height. The planing-disks, as shown in fig. 3, are raised above their proper position, which is but little above the surface of the structure. The timber is prepared for the machine by ripping it into rectangular pieces of convenient width and breadth, which are then cut into blocks of proper length.

The operation of the machine is as follows: The aforesaid blocks are placed in each of the openings $a$ of wheel B, and are held in position, as desired, by the action of the levers $b$ as produced by the weight of the extending ends of said levers. The object of the hinged platforms $m$ and $m'$ is to give the blocks their proper position, in order that the thick end of the shingle may be cut alternately from opposite ends of the blocks. For this purpose the blocks are loosed each time before reaching the saw, by the arms $f$ passing up the inclined arms $h$ and $h$, thus raising the ends of the levers $b$ and releasing the blocks, which are then given the proper position by the platforms. The latter are operated by the springs $r$ across groove S acting against the ends $y$ of the levers $n$, thus raising the platforms automatically to the required position, which may be varied by the action of thumb-screws $g$ on the springs $r$, by which the latter are raised and lowered. The blocks are carried within the circumference of the saws by the rotation of wheel B, by which a shingle is sawed off and dropped beneath the saw, and falls on the chutes M and R, by which they are thrown off from the machine. The blocks then pass over the planers, by which the shingles are smoothed, and are again placed in proper position by the next platform, thus sawing and planing the shingles in a very rapid manner, and without waste of timber.

Having thus fully described my said invention, what I claim, and desire to secure by Letters Patent, is—

The springs or strips, $r$, operated by set-screws $g$, and arranged radially across the annular groove S beneath wheel B, in combination with crank-levers $n$, for adjusting the platforms $m$, substantially as described, and for the purpose set forth.

ADAM G. RITZ.

Witnesses:
K. DuBois Hawley,
John M. Adams.